Dec. 16, 1941.  C. W. CRUMRINE  2,266,169
LENS MOUNT
Filed July 25, 1939  2 Sheets-Sheet 1

CHESTER W. CRUMRINE
INVENTOR
BY
ATTORNEY

Dec. 16, 1941.    C. W. CRUMRINE    2,266,169
LENS MOUNT
Filed July 25, 1939    2 Sheets-Sheet 2
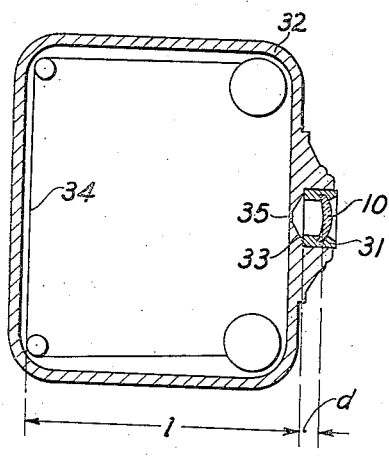
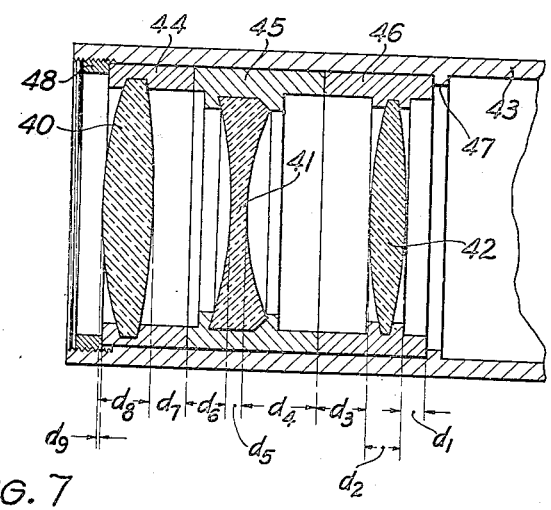
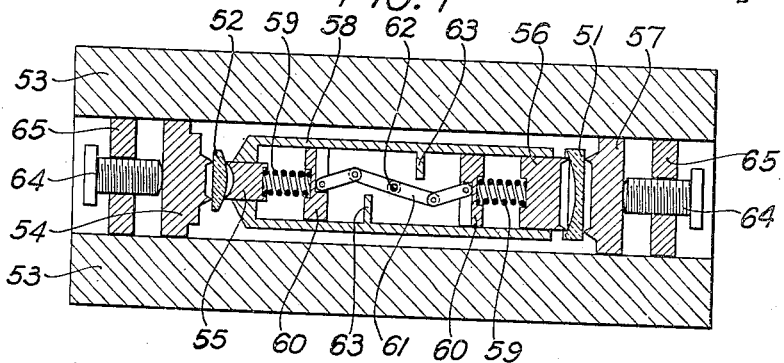
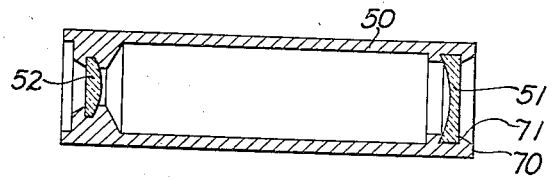
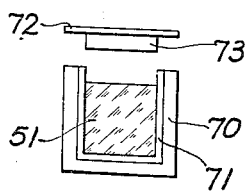
CHESTER W. CRUMRINE
INVENTOR
BY
ATTORNEY Patented Dec. 16, 1941

2,266,169

UNITED STATES PATENT OFFICE 2,266,169

LENS MOUNT

Chester W. Crumrine, Rochester, N. Y., assignor to Eastman Kodak Company, Rochester, N. Y., a corporation of New Jersey Application July 25, 1939, Serial No. 286,384

4 Claims. (Cl. 18—36)

This invention relates to optical systems and particularly to lens mounts.

It is the object of the present invention to provide an inexpensive method and means for mounting lenses and particularly lens elements or simple achromats.

Due to variations in any lens manufacturing process, particularly the less expensive processes such as molding, all lenses of the same design are not identical and a large batch of lenses will include some samples whose power will vary as much as 2 per cent or even more from the predicted value. The variations in power may be due to variations in thickness, variations in refractive index, or more rarely variations in surface curvatures. When the lens is to be used alone (e. g. a simple meniscus lens) these variations are compensated for by measuring or otherwise determining the focal length of the lens and adjusting it in its mount, usually by using shims, so that the lens is positioned in front of the desired image frame (the film plane in a camera) a distance equal to its back focus distance. In fixed focus cameras, the back focus distance is usually conjugate to about 25 feet object distance, i. e. is almost equal to the back focal length.

It is the primary object of the present invention to provide a mount for a lens which is inexpensive and which in itself compensates for any variation of the power of the lens from its correct or predicted value.

With lenses according to the invention, the camera manufacturer or the manufacturer of complete optical systems including the mount can safely assume that as far as his work is concerned, the lenses all have the same focal length and will be accurately focused without any special care to distinguish between the different lenses of the batch.

According to the invention variations in focal length may be compensated for by determining the back focus distance of each lens and molding a plastic rim onto the periphery of the lens with one end surface of the rim a fixed distance from its back focus. The rim on the lens will have inner and outer surfaces and front and rear surfaces the latter two being end surfaces. The invention as thus applied insures that the lens will be the correct distance from the desired image plane independent of its focal length, provided the adjusted end surface of its rim is a predetermined fixed distance from this image plane.

Furthermore, one embodiment of the invention finds more general application, namely for mounting lenses in more complicated lens systems such as used as anastigmatic photographic lenses. In this case, the individual components (elements or cemented lenses) are more carefully made and the variations from predicted power values are small and mainly due to errors in thickness of the element. However, the exact positioning of these lenses relative to the other lenses and to the film plane is more critical and requires more than just insuring that the back focus is correct. As is well known, slight changes in the spacing of the lenses in a complex system, change the aberrations, particularly distortion and curvature of field. When applying the present invention to a complex case, the spacing of the front and rear surfaces of the rim for each lens from that lens with respect to the power of that lens is determined. After that the separate lenses are all inserted in a mount with their rims against separate abutments or against one another. The first alternative permits positioning each lens separately with respect to the image plane and the second alternative permits positioning them relative to one another which is, of course, preferable.

In both embodiments (the single lens and the complex lens system) the end surfaces of the lens rim are spaced from the lens in accordance with the focal length of the lens or at least in accordance with some factor such as the lens thickness which determines the focal length thereof. The relationship is a simple direct one only in the case of a single lens system, i. e. an increase of 1 mm. in the focal length requires an increase or decrease of 1 mm. in the spacing of the end surface of the rim. Elements of complex systems are adjusted for minimum aberration and the relationship follows the complex mathematical laws discovered by lens designers.

According to the preferred embodiment of the invention, such a mount is produced by using a molding machine which includes a concentric lens holding device and an adjusting screw for moving the lens and lens holding device toward or away from the surface of the mold which forms the end surface of the rim. The lens and/or the rim may, of course, be circular, rectangular or any desired peripheral shape. The adjusting screw or whatever equivalent is used for moving the lens holding means relative to the rest of the mold in accordance with the focal length of the lens is provided with and constitutes part of the mold. A scale to be manually set may be coupled to the adjusting device to indicate the setting thereof in terms of lens focal length. On the other hand, if the only variable which is present to cause variable focal length is variable thickness, the lens holding means may be adjusted in accordance with this thickness as by a clamp or rider touching the lens itself. This invention is particularly useful along with those described in copending applications, Serial Numbers 286,385 and 286,386 filed concurrently herewith by myself and by Donald L. Wood respectively.

Other objects and advantages of the invention will be apparent from the following description when read in conjunction with the accompanying drawings in which:

Fig. 5 shows a camera having a lens mounted according to the invention.

Fig. 6 shows a Cooke type lens mounted according to the invention.

Fig. 7 is a horizontal cross section of a mold according to the invention for mounting a view finder system.

Fig. 8 is a view finder system mounted by the apparatus shown in Fig. 7.

Fig. 9 is an end elevation of the view finder shown in Fig. 8.

Figure 1:
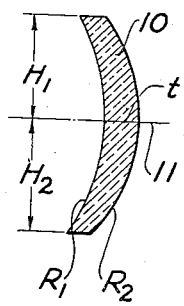
Fig. 1 shows a cross section of a simple meniscus lens.

In Fig. 1 there is shown an ordinary meniscus lens element 10 having an optic axis 11 and an axial thickness $t$. This is a meniscus lens with its front and rear curvatures R2 and R1 respectively. This figure represents one of a large number of lenses as normally produced by any of the common manufacturing processes. As is well known, lenses of a particular batch vary from one another. For example the lens may not be centered and the diameter measured from the optic axis 11 may be different, as shown by H1 and H2. The present invention is concerned with other variations such as variations in thickness $t$ or variations in the curvatures R1 and R2 or even variations in the index of refraction of the glass used. These variations cause a variation in focal length or power of the element and it is customary when using such lenses to measure their focal length and to mount them in a camera accordingly. The usual procedure is to sort the lenses into batches according to focal length and then to mount all of the lenses of one batch in the same way. When changing to another batch of lenses the camera is adjusted accordingly.

Figure 2:
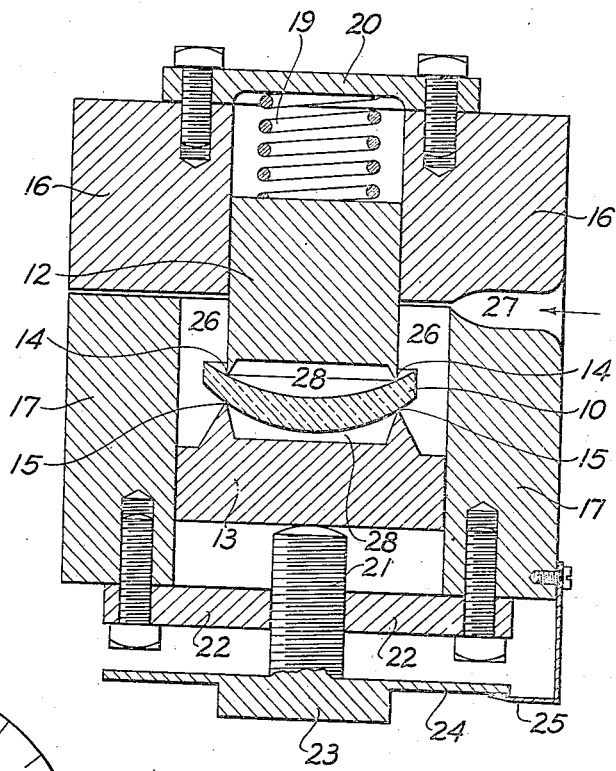
Fig. 2 shows a molding machine according to one embodiment of the present invention.
Figure 4:
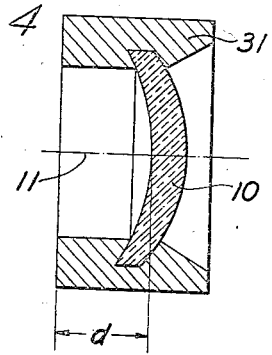
Fig. 4 shows the lens element of Fig. 1 mounted according to the invention.

In Fig. 2 there is shown the cross section of a simplified molding machine for mounting the element shown in Fig. 1 so as to compensate for these variations in focal length. The molding dies comprise an upper mold 16 which may be held in any suitable manner against a lower mold 17. The lens element 10 is carried by plungers 12 and 13 mounted in the molds 16 and 17 respectively. For centering the lens, the plungers 12 and 13 are provided with a zonal clamp consisting of members 14 and 15 respectively which clamp members separate the peripheral chamber 26 from the paraxial chamber 28. The arrangement shown is an injection molding machine and the plastic is injected through a nozzle 27 into the chamber 26 and forms a plastic rim on the lens, which rim 31 is best seen in Fig. 4. The zonal clamp members 14 and 15 prevent the plastic from reaching the chamber 28. Furthermore since the clamp member 14 has a diameter equal or less than that of the clamp member 15, there is no upward component of the pressure under which the plastic is injected against the plunger 12.

The plunger 12 is held down against the lens 10 by means of a spring 19 and rigid plate 20. The plunger 13 is held up against the lens 10 by means of a screw 21 on rigid plate 22.

Figure 3:
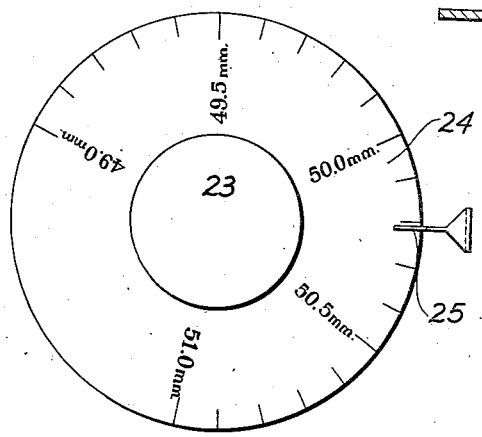
Fig. 3 shows the adjustment scale of the device shown in Fig. 2.

According to the invention, this screw 21 is adjusted by means of a knob 23 carrying a scale 24. The scale 24 and its accompanying index 25 is illustrated in plan view in Fig. 3. As the screw 21 is turned upward, the lens 10 is carried upward by the zonal clamp member 15 pushing the zonal clamp member 14 upward against the force of the spring 19. This moves the lens 10 nearer to the lower wall of the mold 16, i. e. nearer to the upper wall of the chamber 26.

As seen in Fig. 4 this movement reduces the distance $d$ between the end surface of the rim 31 and the lens 10. The distance $d$ is measured on the optic axis 11 of the lens 10. In the example shown, the lens 10 is supposed to have a focal length of 50.0 mm. That is, the average focal length of a large batch of these lenses is 50.0 mm. Due to manufacturing errors these lenses may vary as much as 2 per cent i. e. anywhere from 49.0 mm. to 51.0 mm. When practicing the present invention, the lenses are all sorted according to focal length and the rims 31 are molded onto one batch at a time. The scale 24 is adjusted to the focal length of the batch to be run and all of the lenses of this batch are mounted without changing this adjustment. The adjustment is then changed in accordance with the focal length of another batch and this other batch is then run off, the lenses are delivered to the camera manufacturer who is then free to consider that all of the lenses have exactly the same focal length. This is due to the fact that the camera manufacturer mounts the lens in accordance with the end surface of the rim 31. Thus there is eliminated all adjustments of the lens mount of the camera which adjustment ordinarily involves grinding or the use of shims.

The lens 10 in its lens mount 31 is shown in Fig. 5 as mounted in a camera 32. The camera 32 is of molded construction and has a film plane 34 and opposite to it a recess in the housing 32 which recess is shaped accurately to receive the lens 10 and its rim 31. The diaphragm 35 of the lens 10 is molded into the camera housing 32. When the lens 10 in its mount 31 is inserted in the camera 32 so that the rear end surface of the mount 31 presses against an abutment 33 in the camera 32, the lens 10 is properly focused with respect to the film plane 34. This is a fixed focus camera and hence the back focus, i. e. the distance between the lens 10 and the film plane 34 should be slightly greater than the focal length of this lens 10 and equal to the focus conjugate to an object distance of about 25 feet. That is, the back focus of the lens 10 should equal the distance $1+d$. In the manufacture of the cameras the distance 1 is maintained constant and this procedure is perfectly satisfactory since the distance $d$ is preadjusted according to the invention in accordance with the focal length of the lens element 10.

Thus according to the invention by merely inserting the element 10 manually into the camera 32 so that it presses against the abutment 33, one is able to perform the formerly expensive operation of focusing the lens. Furthermore since the lens is also mounted in accordance with the invention of Wood as described in his above-mentioned application, this same simple operation automatically centers the lens 10 on the optic axis of the camera 32 which was also an expensive operation formerly.

In Fig. 6, a complex photographic objective comprising spaced elements 40, 41, and 42 is mounted in accordance with the invention. Each element is mounted according to the invention in a rim 44, 45, and 46 respectively with both end surfaces of the rims adjusted with respect to the focal length of the elements 40, 41, and 42 respectively so that when these elements are inserted in a lens mount 43 as shown, the elements are properly adjusted to have the minimum distortion. That is, the lens system is computed so as to have a minimum amount of aberrations and then any slight variations of the elements 40, 41 and 42 from their correct values are compensated for by adjustment of the individual mounts of the elements during molding. The end surface of the element 46 is against an abutment 47 in the mount 43 and the end surfaces of the other rims 45 and 44 are in contact successively. A ring 48 mounted in a screw thread in the mount 43 holds the rim 44 against the rim 45 and the rim 45 against the rim 46. That is, the elements have thickness $d8$, $d5$, and $d2$ respectively and the spacing of these lenses from the end surfaces of rims, which spacings are labeled $d1$, $d3$, $d4$, $d6$, $d7$, and $d9$ are adjusted in accordance with the invention. It will be noticed that $d9$ is actually negative with respect to the other spacings but is, of course not critical. $d1$ may determine the back focus of the system or this may be separately adjusted in which case $d1$ is not critical either. $d3$, $d4$, $d6$ and $d7$ are adjusted so that the separation of the elements 40, 41 and 42 are such that aberrations are a minimum.

In Fig. 7, a method of mounting a view finder according to the invention is illustrated. This figure illustrates only the lower half 53 of a molding machine and no injection nozzle appears in this cross section. Fig. 7 is perhaps best understood by reference to Fig. 8 which illustrates the resulting optical system. The lenses 51 and 52 are held in correct optical alignment and correctly spaced by zonal clamps 54, 55, 56, and 57 and while in this position a housing for the view finder and a mount for each element is molded all of one piece. This housing and mount is illustrated in Fig. 8 as 50. By means of screws 64 mounted in plates 65, the zonal clamp members 54 and 57 are adjusted axially. The zonal clamp members 55 and 56 are held by springs 59 mounted in pistons 60 which are adjusted by rods 61 pivoted at the point 62.

The operation of this device is as follows. Screws 64 are adjusted in accordance with the focal lengths of the elements 52 and 51. The elements 52 and 51 are then inserted in place and the connecting rods 61 are turned on the pivot 62, the amount of turning being determined by abutments 63 to bring the clamps 55 and 56 against the elements 52 and 51 respectively. The plastic to form the mount 50 is then injected and allowed to harden. The pressure of the clamps 55 and 56 is then released by turning the rod 61 clockwise and the whole inside portion of the mount including the clamp members 55 and 56 and the cylinder in which these clamp members slide is removed with the upper portion (not shown) of the mold. In the arrangement shown, it would then be necessary to move the clamp members 54 and 57 outward so that the lens mount 50 could be removed from the mold. Any convenient and quick method for moving the clamp members 54 and 57 together with the screws 64 and plate 65 may be employed in this connection or the screws 64 may be unscrewed the necessary distance.

In molding view finder systems as shown in Figs. 7 and 8, only three sides of the housing are formed in this mold and the fourth side or cover is molded separately. This is best seen in Fig. 9 which illustrates the end view of the view finder system shown in Fig. 8. In the arrangement shown the view finder housing 50 has an end surface 70 and a bevel 71 adjacent to the lens element 51. The upper surface or cover of the view finder is formed by a molded flat plate 72 having projections 73 thereon corresponding to the projections from the housing 50 which form the mounts for the lenses 51 and 52. In general the cover 72 is not necessary since the view finder is mounted on a camera which is itself properly molded to act as the fourth surface of the housing 50.

Because of the complexity of the mold, view finder systems are generally molded individually but of course it is possible to mold several simultaneously as is customary in the molding art. Of course, the molding of the rim 31 for the lens elements 10 as shown in Figs. 1 to 4 is usually carried out so that 8 or 10 lens rims are molded simultaneously on a star mold.

Having thus described the various embodiments of my invention, I wish to point out that it is not limited to the specific structures shown but is of the scope of the appended claims.

What I claim and desire to secure by Letters Patent of the United States is:

1. A device for mounting a lens to compensate for any variation in the rear focus thereof from the correct value which comprises means for molding a rim onto the periphery of the lens, said molding means including a mold surface for forming one of the end surfaces of said rim, means for holding the lens in the molding means at a predetermined distance from said mold surface during the molding and adjusting means on the molding means for adjusting said predetermined distance before the molding to bring said one of the end surfaces of said rim to a fixed distance from said rear focus.

2. A device according to claim 1 in which said lens holding means centers the optic axis of the lens with respect to the periphery of the rim mold.

3. A device for molding a plastic rim onto a lens element comprising means for receiving and holding the plastic during molding which plastic molding means includes walls for defining the outer periphery of the rim, walls for defining the end surfaces of the rims, and lens holding means for defining the inner surface of the rim and for holding said lens element and means for adjusting the lens holding means relative to the walls defining the end surfaces of the rim in accordance with the power of the lens element.

4. A device for mounting an optical system including a plurality of spaced elements, which device comprises means for molding in one piece a plastic housing for the system and rims gripping the peripheries of the elements and extending at least partially there-around, means forming part of said molding means for holding the lens elements in optical alignment in the housing during molding and means for axially adjusting said holding means in accordance with the powers of the elements to compensate for slight variations of said powers from their correct values.

CHESTER W. CRUMRINE.